(No Model.)
B. R. DAVENPORT.
BUGGY CURTAIN FASTENER, &c.
No. 394,758. Patented Dec. 18, 1888.
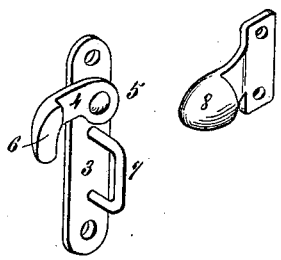
Fig. I.
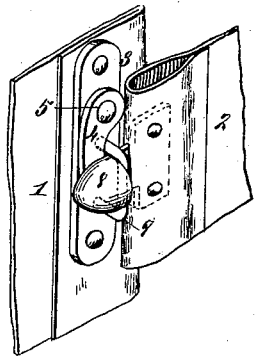
Fig. II.
Fig. III.
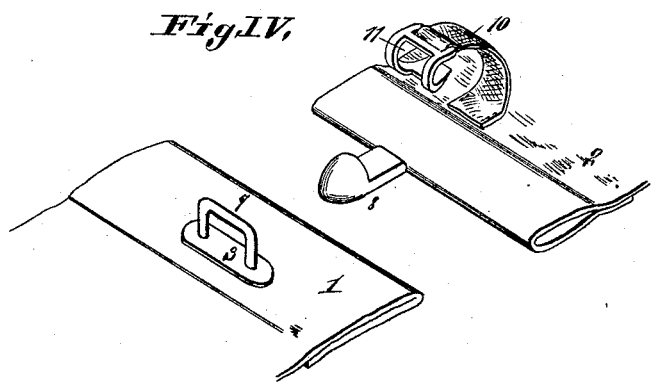
Fig. IV.
Attest:
E. Arthur
S. H. Knight.
Inventor:
Benjamin R. Davenport,
By Knight Bros.
Attys

UNITED STATES PATENT OFFICE.

BENJAMIN R. DAVENPORT, OF CHICAGO, ILLINOIS, ASSIGNOR TO THE CALUMET FASTENER COMPANY, OF SAME PLACE.

BUGGY-CURTAIN FASTENER, &c.

SPECIFICATION forming part of Letters Patent No. 394,758, dated December 18, 1888.

Application filed May 26, 1888. Serial No. 275,193. (No model.)

*To all whom it may concern:*

Be it known that I, BENJAMIN R. DAVENPORT, of the city, county, and State of New York, have invented a certain new and useful Improvement in Buggy-Curtain Fasteners, &c., of which the following is a full, clear, and exact description, reference being had to the accompanying drawings, forming part of this specification, and in which—

Figure I is a perspective view showing the two members of my improved fastener and showing them disconnected. Fig. II is a similar view showing the parts connected. Fig. III is a section. Fig. IV is a perspective view illustrating a modification.

My invention relates to an improved fastener, which may be used on buggy-curtains and for various other purposes; and my invention consists in features of novelty hereinafter fully described, and pointed out in the claims.

Referring to the drawings, 1 represents a portion of a buggy-top and 2 part of the curtain. To the top 1 is secured a plate, 3, to which is pivoted an arm, 4, at 5. The end of the arm is preferably made in the form of a wedge, 6, as shown in Fig. I. Secured to the plate 3 is also a staple or eye, 7. Secured to the curtain 2 is a hook, 8, the head of which is just the proper size to pass through the staple 7 when the arm is thrown back, as shown in Fig. I. After the hook is inserted, the wedge is moved into the position shown in Figs. II and III, which moves the hook away from the plate 3 and causes it to engage the staple, and as long as the wedge remains behind the hook the latter is held into positive engagement with the staple.

When it is desired to unfasten the curtain, the wedge is moved from behind the hook, which then moves back toward the plate 3, when it may be withdrawn, as stated.

While I prefer to pivot the wedge as shown in Figs. I and II, yet I do not confine myself to this construction, as it may be arranged in other ways.

In Fig. IV I have shown the wedge attached to the curtain by means of an elastic or other strip, 10, which allows the wedge to be moved over the end of the hook when the latter has been inserted through the staple, and in this case the wedge is provided with an opening, 11, to receive the end of the hook to hold the wedge in place while in use.

I have shown the invention applied to and have spoken of it as a fastener for buggy-curtains; but I do not confine myself to this use, as it may be applied to various other uses—as, for instance, on shoes, overalls, &c.

I claim as my invention—

1. The combination of a staple secured to one of two pieces to be united together, a hook secured to the other piece, and a wedge adapted to fit behind the hook to force and hold it into engagement with the staple, substantially as and for the purpose set forth.

2. In a fastener, the combination of a staple secured to one of two pieces to be united together, a hook secured to the other piece, and a pivoted wedge adapted to fit behind the hook and to force and hold the hook into engagement with the staple, substantially as and for the purpose set forth.

BENJAMIN R. DAVENPORT.

Witnesses:
HERBERT KNIGHT,
JOHN F. NELSON.